United States Patent

De La Mare et al.

[15] 3,670,054
[45] June 13, 1972

[54] BLOCK COPOLYMERS HAVING REDUCED SOLVENT SENSITIVITY

[72] Inventors: Harold E. De La Mare, El Cerrito, Calif.; Alfred W. Shaw, Stanford, Conn.

[73] Assignee: Shell Oil Company, New York, N.Y.

[22] Filed: Oct. 29, 1969

[21] Appl. No.: 872,387

[52] U.S. Cl............................................260/880 B, 260/879
[51] Int. Cl.........................................C08f 15/04, C08f 27/24
[58] Field of Search......................................260/880 B, 879

[56] References Cited

UNITED STATES PATENTS 3,251,905   5/1966   Zelinski..............................260/888
3,431,323   3/1969   Jones..................................260/880

Primary Examiner—James A. Seidleck
Attorney—William H. Myers and Joseph W. Brown

[57] ABSTRACT

Block copolymers are provided which exhibit reduced sensitivity to organic solvents which comprise block copolymers of at least one elastomeric conjugated diene polymer block, block copolymerized with at least two monovinyl arene polymer blocks, all chains also containing either polyethylene or butadiene blocks, this latter block at least being hydrogenated to an extent sufficient to reduce the original double bonds by at least about 80 percent.

4 Claims, No Drawings

BLOCK COPOLYMERS HAVING REDUCED SOLVENT SENSITIVITY

This invention is concerned with improved block copolymers. More particularly, it is directed to block copolymers exhibiting substantially improved resistance to organic solvents while still maintaining or enhancing its other physical properties and physical characteristics.

Within the past few years, a substantial body of art has emerged concerned with block copolymers. Primarily, they are usually formed from block copolymerizing conjugated dienes with monovinyl arenes such as styrene. They may be either linear or branched in their macromolecular configuration and they may be utilized in their original state or derivatized such as by hydrogenation. The hydrogenation may be either selective or complete. If selective, it is generally the conjugated diene polymer blocks which are first reduced since they show the greatest activity to hydrogenation catalyst normally employed for this purpose. The physical characteristics of the block copolymers are governed by the weight ratio of the several species of monomers involved and by the individual block molecular weights as well as by the arrangements of the blocks relative to each other. The most acceptable configuration studied up to the present time may be typified by the general structure A—B—A wherein each A is a monovinyl arene polymer block and B is a conjugated diene polymer block. A typical block copolymer of this type would be polystyrene-polyisoprene-polystyrene. Up to about 55 weight percent of monovinyl arene polymer blocks, this type of block polymer is generally referred to as a "thermoplastic elastomer." By this is meant a polymer which behaves as a vulcanized rubber below its softening point but acts as a thermoplastic melt above its softening point; and, moreover, even after being raised to such a melt temperature and thereafter cooled, resumes its properties of an elastomer. This type of behavior is sharply contrasted to that experienced with normal rubbers which require vulcanization to attain their maximum stress-strain properties. Vulcanized rubbers such as natural rubber or polybutadiene, once vulcanized, are intractable materials which cannot be melted and processed like thermoplastic materials. Moreover, once vulcanized and shaped they cannot be put through the same cycle of operations as can the thermoplastic elastomers which do not require vulcanization. Above about 55 weight percent of monovinyl arene polymer blocks, the block copolymers gradually assume the properties of high impact thermoplastic materials. Either the thermoplastic elastomers or the high impact thermoplastic types of block copolymers may be hydrogenated to improved particularly their stability and increase their high temperature performance. They may be blended with other polymers such as polystyrene or polyethylene and they may be extended with mineral oils as well as dispersed in residual petroleum products such as asphalts or other bitumens.

In spite of the impressive array of physical properties which these block copolymers exhibit, they have certain limiting characteristics, one of the most serious which is their sensitivity to organic solvents and particularly to relatively volatile hydrocarbons. Contact with such solvents causes disintegration of the polymer or at least an undesirably high degree of swelling depending on the circumstances and species of the solvents involved as well as upon the particular block copolymer so exposed. It would be highly desirable to eliminate or minimize this solvent sensitivity so as to broaden the utility of block copolymers into many fields which it now cannot enter or only so on a limited basis.

It is an object of the present invention therefore to provide improved block copolymers. It is a further object of the invention to provide both precursors and hydrogenated block copolymer showing substantially improved physical properties. More particularly, it is a primary object of the invention to provide improved block copolymers having substantially reduced sensitivity to organic solvents. Other objects will become apparent during the following detailed description of the invention.

Now, in accordance with the present invention, improved block copolymers are provided comprising those of the group consisting of block copolymers characterized by having at least one first elastomeric conjugated diene polymer block B with an average molecular weight between about 25,000 and 200,000 copolymerized with two non-elastomeric monovinyl arene polymer blocks A with an average molecular weight between about 7,500 and 100,000 all polymer chains containing polymer blocks C of the group consisting of polyethylene and butadiene, polymer blocks C having an average molecular weight between about 1,000 and 15,000, said blocks C having less than about 25 mol percent of the monomer units in a non-linear, i.e., branched configuration; and hydrogenated derivatives of said block copolymers. The invention thus provides for both non-hydrogenated and hydrogenated block copolymers having improved potential and physical characteristics. The non-hydrogenated block copolymers may be regarded as the precursors of the hydrogenated copolymers. However, the small end blocks may be formed of either polyethylene or a short butadiene polymer block which is eventually hydrogenated. In its hydrogenated state, of course, the short butadiene polymer block, being no more than moderately branched, will resemble a polyethylene block of the same average molecular weight.

The present invention, therefore, expressed in its most simple terms with respect to configuration, lies in modifying the basic block copolymer A—B—A with short end blocks which when hydrogenated resemble polyethylene.

A typical polymer illustrating the invention, prior to hydrogenation, would be one having the block structure polybutadiene-polystyrene-polyisoprene-polystyrene-polybutadiene in which the polybutadiene blocks are relatively short compared with the substantially larger blocks of both polystyrene and polyisoprene: Upon hydrogenation of such a polymer, at least the polybutadiene blocks are hydrogenated to reduce its unsaturation by at least 80 percent. Under the normal conditions, the polyisoprene block would be hydrogenated to approximately the same extent during the same hydrogenation operation. With somewhat more stringent hydrogenation conditions the polystyrene blocks may also be hydrogenated.

The block copolymers coming within the scope of the present invention are those having at least two non-elastomeric monovinyl arene polymer blocks separated by a first elastomeric conjugated diene polymer block. The terminal ends of the polymer chains are relatively low molecular weight essentially unbranched polybutadiene or polyethylene blocks. By this is meant polymer blocks wherein less than about 25 mol percent of the monomeric units have substituents dependent from the main polymer block chain. Alternatively, the latter relatively low molecular weight polymer blocks may be polyethylene blocks or mixtures thereof with an unbranched butadiene polymer block. The objective, as stated hereinbefore, is accomplished by reducing any unsaturation in the low molecular weight butadiene blocks by at least about 80 percent utilizing hydrogenation for this purpose. However, it is necessary to restrict the molecular weights of these blocks since if too low a molecular weight is utilized the effect obtained is insignificant. On the other hand, if a molecular weight of the block is too high then undesirable physical characteristics are imparted to the hydrogenated polymer. For most purposes, the block copolymers of this invention should comprise between about 0.5 and about 40 (preferably 3–15) weight percent of blocks C. The weight proportions of blocks A and B will depend on whether an elastomeric or a thermoplastic type of polymer is desired. Preferably, for elastomeric products the copolymers should contain 15–55 weight percent of blocks A.

Consequently, it is necessary to restrict the average molecular weight of the second butadiene polymer block or polyethylene block to between about 1,000 and 15,000, preferably about 1,500 and 5,000. Since the principle self-vulcanizing characteristics of the block copolymer are governed by the monovinyl arene polymer blocks and their relationship to the large first elastomeric conjugated diene polymer blocks, their molecular weights also are of substantial importance. The first elastomeric conjugated diene polymer blocks should have an average molecular weight between about 25,000 and 200,000, preferably between about 35,000 and 100,000. The monovinyl arene polymer block should have an average molecular weight between about 7,500 and 100,000, preferably between about 8,500 and 75,000. The block copolymers may have a macromolecular structure which is either linear or branched and will have at least five polymer blocks, thus the most simple configuration will be as follows: C—A—B—A—C wherein the C's are the short butadiene polymer blocks, the A's are the monovinyl arene polymer blocks, and B is the larger first elastomeric conjugated diene polymer block. The copolymer may have a linear configuration of greater length, represented by the preferred formulation C—A—(B—A)$_n$—C wherein $n$ is an integer from 1 to 5. On the other hand, the polymer may have a branched configuration which is variously referred to in the art as star-shaped, radial, etc. Since this is normally obtained by a special type of coupling reaction, the branching usually occurs as follows: C—A—B—(B—A—C)$_n$ wherein $n$ again is an integer from 1 to 5. Wherever adjacent blocks are essentially identical in monomer species with about the same microstructure, as may occur in coupled polymers, the adjacent blocks are regarded as a simple block. Combination of these two types of linear and branched polymers may be employed if so desired. The above formulations represent the non-hydrogenated precursors as well as the corresponding configuration of the hydrogenated derivatives thereof. Typical species of block polymers coming within the consideration of the present invention are represented in the following list which include the non-hydrogenated precursors. It will be understood that upon hydrogenation of these block polymers the configuration will be maintained but the individual blocks may be altered. For example, the polybutadiene end blocks will then become essentially polyethylene blocks while the polyisoprene block, if substantially completely hydrogenated becomes in effect an ethylene propylene elastomeric polymer block. Polystyrene blocks when hydrogenated become essentially polyvinylcyclohexane blocks. In accordance with the present invention it is necessary to hydrogenate at least the blocks C referred to in the above structural formulae and as mentioned hereinbefore normally the larger first conjugated diene elastomeric block will be hydrogenated at the same time.

The polymers may be either elastomeric or thermoplastic in their primary physical characteristics. This will depend in a substantial measure upon the individual block molecular weights.

In addition to those copolymer species in which the blocks C are fixed at terminals of the copolymer chains, it is also contemplated that the blocks C may be positioned in non-terminal positions, as illustrated:

(BAC)$_n$ and A—C—(B—C—A)$_n$ wherein $n$ is a small integer preferably 1–5.

BLOCK POLYMERS polybutadiene 1,4-polystyrene-polybutadiene 35 percent 1,2-polystyrene-polybutadiene 1
polystyrene-polybutadiene 1,4-polystyrene-polybutadiene 35 percent 1,2-polybutadiene 1,4-polystyrene
polybutadiene-polystyrene-polyisoprene-polystyrene-polybutadiene;
(polybutadiene/polyisoprene)-polystyrene-polyisoprene-polystyrene-(polybutadiene/polyisoprene);
polybutadiene-polystyrene-[poly(butadiene/isoprene)]-polystyrene-polybutadiene;
polybutadiene-polystyrene[poly(butadiene/styrene)]-polystyrene-polybutadiene;
polybutadiene-poly(alpha methyl styrene)-polyisoprene-poly(alpha methyl styrene polybutadiene;
polyethylene-polystyrene-polyisoprene-polystyrene-polyethylene.

The monomers utilized in the preparation of the subject block copolymers generally comprise butadiene in the relative low molecular weight block later to be hydrogenated to form polyethylene type blocks, while butadiene or isoprene as well as mixtures thereof may be utilized in the formation of the relatively higher molecular weight elastomeric conjugated diene polymer blocks. Styrene and alpha methyl styrene are preferred monovinyl arenes. It will be understood that each of the blocks may be copolymer blocks as long as they possess the individual physical characteristic described hereinbefore. Thus the conjugated diene elastomeric polymer block may comprise a copolymer of a conjugated diene and a monovinyl arene, the latter being present in less than about 40 weight percent. On the other hand, the non-elastomeric polymer blocks may comprise copolymers of styrene with alpha methyl styrene or of styrene or alpha methyl styrene with a conjugated diene, as long as the proportion of conjugated diene is low enough to maintain the non-elastomeric character of the block. This will usually be in polymer blocks containing less than about 40 weight percent of conjugated diene. The following examples illustrate the preparation and properties of the block copolymers within the scope of the present invention. It is preferred that the short polybutadiene blocks have at least 45 percent cis 1,4-content and less than 25 percent 1,2-content. If the high molecular weight diene block predominates in butadiene, it is preferred that it have 35–55 percent 1,2-content, all as measured by infrared.

The process of synthesizing the block copolymers will depend upon the desired marcomolecular configuration. Essentially, the polymerization process comprises the use of a lithium based initiator which may be monofunctional or polyfunctional. In its most simple form, the process may comprise the sequential addition of the desired monomers in a hydrocarbon medium in the presence of a lithium alkyl such as butyl lithium. This will produce a linear polymer of any desired number of blocks, the molecular weight being controlled by the amount of monomer and the ratio thereto of lithium alkyl. A more preferred process for closer molecular weight control comprises the combined use of a sequential process with a coupling step. For example, a first polymer may be formed having the structure polybutadiene-polystyrene-Li after which a difunctional or polyfunctional coupling agent is added causing the coupling of this first copolymer to form dimers, trimers, or tetramers thereof. The dimers are regarded as linear polymers while the trimers, tetramers, etc. are referred to as star, branched, or radial polymers. Coupling agents include difunctional halohydrocarbons such as dibromobutane, divinylbenzene, polyfunctional coupling agents or an especially preferred type of coupling agent comprising a diester formed between a dicarboxylic acid and a monohydric alcohol such as diethyl adipate. This results in a product which appears to be largely a trimer of the polymer being coupled with possibly some tetramer thereof in the final product.

Block copolymers may be prepared with hydrogenation of terminal polybutadiene blocks by di-initiation of the middle conjugated diene block, block polymerizing a monovinyl arene on the growing ends of the polymer chain and thereafter block polymerizing ethylene therewith, preferably in the presence of a chelating amine such as tetramethyl ethylene diamine.

The resulting block copolymers may be regarded as the precursors of the hydrogenated specie with which this invention is especially concerned. Hydrogenation may be effected especially by the use of nickel, cobalt, or iron compounds reduced with an aluminum reducing agent. Thus, nickel or cobalt carboxylates or alkoxides may be utilized together with an aluminum trialkyl compound. Hydrogenation may be carried out at temperatures of about room temperature to about 175° C. Hydrogen pressures may be varied from about 250 to 5,000 psi and the time of hydrogenation will vary from a few minutes to several hours. The hydrogenation conditions may TABLE I.—SYNTHESIS OF SOLVENT RESISTANT (e-S-EB-)$_2$ BLOCK POLYMERS Conditions: Cyclohexane; s-BuLi initiation

| Run | $M_n$ calcd. $(10^{-3})$ | Molecular weight$\times 10^{-3}$ | Overall [a] composition | | | Calcd. (from $M_t$) percent S |
|---|---|---|---|---|---|---|
| | | | Percent 1, 2B | Percent B | Percent S | |
| A | 1.5–14–35.0 | 1.4–13.0–31.6 | 43 | 69 | 31 | 28 |
| B | 3.0–14–34.6 | 2.6–13.8–33.4 | 41 | 72 | 28 | 28 |
| C | 5.0–14–35.0 | 4.7–13.6–32.5 | [b] 40 | 73 | 27 | 27 |

[a] By A–60 NMR analysis.
[b] This is equivalent to 45% 1,2 in center block; end block composition in all cases is ~10% 1,2.

TABLE II.—STRESS-STRAIN PROPERTIES OF THE HYDROGENATED POLYMERS

Microslab specimens molded at 190°/15′

| Run | Molecular weight of end block | $T_B$, p.s.i. | $M_{300}$, p.s.i. | $M_{500}$, p.s.i. | $E_B$, percent | Set, percent | Swelling ratios [a] in— | | | |
|---|---|---|---|---|---|---|---|---|---|---|
| | | | | | | | Iso-octane | Toluene | Perchloro-ethylene | $CS_2$ |
| A [c] | 1,400 | 4,700 | 400 | 1,100 | 720 | 5 | (6.9)[b] 5.6 | (8.9)[b] Sol. | (9.4)[b] | (10.0)[b] |
| B | 1,400 | 5,600 | 710 | 1,900 | 610 | 30 | 2.7 | Sol. | | |
| C | 2,900 | 4,800 | 770 | 1,800 | 570 | 55 | 2.8 | >22 | Sol. 16 | Sol. 29 |
| D | 4,700 | 5,400 | 730 | 1,900 | 570 | 50 | 2.2 | 4 | | |

[a] Weight of swollen polymer/weight of specimen at room temperature.
[b] Solubility parameters at 25° C.
[c] The unhydrogenated precursor of B.

be adjusted so as to selectively hydrogenate the conjugated diene blocks to the virtual exclusion of the monovinyl arene polymer blocks or on the other hand substantially complete hydrogenation may be obtained by the use of somewhat more stringent hydrogenation conditions. Especially favorable results are obtained by hydrogenating at least about 80 percent of the unsaturation in the conjugated diene polymer blocks and 35–55 percent of the unsaturation in the monovinyl arene polymer blocks.

EXAMPLE

A series of block polymers was prepared having the configuration polybutadiene-polystyrene-polybutadiene-polystyrene-polybutadiene. Conditions were employed so as to promote the microstructure of the polybutadiene end blocks to be principally 1,4, while ether was added during the formation of the center polybutadiene block to give a 1,2 content of about 45 percent. The polymers were prepared by sequential polymerization in cyclohexane using secondary butyl lithium as the initiator. Butadiene was introduced to form the first short polybutadiene block, after which styrene and ether was injected to form the first polystyrene block, after which butadiene was injected to form the first half of the center block having a 1,2-structure. The block copolymer, ending with a lithium ion, was then coupled using phenyl benzoate as the coupling agent. The block copolymers so formed were hydrogenated at 70° C and 800 psi hydrogen pressure using a catalyst which was the reaction product of nickel octoate and aluminum triethyl, the molar ratio of these being 0.6 and 1.5, respectively. The NMR analyses of the hydrogenated products showed that the diene polymer blocks had been substantially completely hydrogenated but that the polystyrene blocks were virtually unaffected. The hydrogenated polymers all showed excellent stress-strain properties as shown in Table II below. Table II also shows the increase in solvent resistance as the molecular weight of the short end blocks was increased from 1,500 to 5,000. Substantial solvent resistance began to appear at about 3,000 molecular weight in the end blocks and at 5,000 the block copolymer was insoluble in toluene, perchloroethylene and carbon disulfide. Table 1 summarizes the block molecular weights and microstructure of the block copolymer precursors.

We claim as our invention:

1. A block copolymer of the group consisting of:
   1. block copolymers having the configuration

C—A—B—A—C wherein:
   each A is a non-elastomeric monovinyl arene polymer block having an average molecular weight between about 7,500 and 100,000; B is an elastomeric conjugated diene polymer block having an average molecular weight between about 25,000 and 200,000, said block B being of the group consisting of polybutadiene blocks having 35–55 percent 1,2-content and polyisoprene blocks; and
   each C is a polybutadiene block having an average molecular weight between about 1,000 and 15,000, said blocks C having less than 25 percent 1,2-content and comprising 0.5–40 percent by weight of the block copolymer; and
   2. hydrogenated derivatives of said block copolymers wherein at least 80 percent of the unsaturation in each of blocks B and C has been reduced by hydrogenation.

2. A composition according to claim 1 wherein the first conjugated diene polymer block has an average molecular weight between about 35,000 and 100,000, the second conjugated diene polymer block has an average molecular weight between about 1500 and 5,000 and the monovinyl arene polymer block has an average molecular weight between about 9,500 and 75,000.

3. A hydrogenated block copolymer according to claim 1 wherein the block structure prior to hydrogenation is polybutadiene cis 1,4-polystyrene-polybutadiene 1,2-polystyrene-polybutadiene 1,4 wherein the polybutadiene 1,2 block has 35–55 percent 1,2 content and the polybutadiene 1,4 blocks have at least 45 percent cis 1,4 content and less than about 25 percent 1,2 contents.

4. A hydrogenated block copolymer according to claim 1 wherein the block structure prior to hydrogenation is polybutadiene cis 1,4-polystyrene- polyisoprene-polystyrene-polybutadiene cis 1,4.

\* \* \* \* \*